(12) United States Patent
Lei et al.

(10) Patent No.: US 9,346,130 B2
(45) Date of Patent: May 24, 2016

(54) METHOD FOR LASER PROCESSING GLASS WITH A CHAMFERED EDGE

(75) Inventors: Weisheng Lei, San Jose, CA (US);
Glenn Simenson, Portland, OR (US);
Hisashi Matsumoto, Hillsboro, OR (US); Guangyu Li, Portland, OR (US);
Jeffery Howerton, Portland, OR (US)

(73) Assignee: Electro Scientific Industries, Inc., Portland, OR (US)

( * ) Notice: Subject to any disclaimer, the term of this patent is extended or adjusted under 35 U.S.C. 154(b) by 886 days.

(21) Appl. No.: 12/336,609

(22) Filed: Dec. 17, 2008

(65) Prior Publication Data

US 2010/0147813 A1 Jun. 17, 2010

(51) Int. Cl.
*B23K 26/00* (2014.01)
*B23K 26/03* (2006.01)
*B23K 26/40* (2014.01)
*C03B 33/08* (2006.01)

(52) U.S. Cl.
CPC .............. *B23K 26/40* (2013.01); *C03B 33/082* (2013.01); *B23K 2203/50* (2015.10)

(58) Field of Classification Search
CPC .............. B23K 26/00–26/428; B23K 26/4075; C03B 33/082
USPC ......................................... 219/121.6–121.83
See application file for complete search history.

(56) References Cited

U.S. PATENT DOCUMENTS

| | | | |
|---|---|---|---|
| 4,702,042 A | 10/1987 | Herrington | |
| 4,828,900 A | 5/1989 | Mouly | |
| 5,043,553 A * | 8/1991 | Corfe et al. | ................ 219/121.7 |
| 5,413,664 A | 5/1995 | Yagi et al. | |
| 5,609,284 A | 3/1997 | Kondratenko et al. | |
| 5,637,244 A * | 6/1997 | Erokhin | ................... 219/121.69 |
| 5,665,134 A | 9/1997 | Kirby et al. | |
| 5,826,772 A | 10/1998 | Ariglio et al. | |
| 5,973,290 A | 10/1999 | Noddin | |
| 6,143,382 A | 11/2000 | Koyama et al. | |

(Continued)

FOREIGN PATENT DOCUMENTS

| CN | 1657220 A | 8/2005 |
|---|---|---|
| CN | 100471609 C | 3/2009 |

(Continued)

OTHER PUBLICATIONS

International Search Report of PCT/US2009/067988, 3 pages.

(Continued)

*Primary Examiner* — Sang Y Paik

(57) ABSTRACT

A laser machining process is described for laser machining glass or glass-like materials. This process machines articles or features in articles with chamfered edges in one manufacturing operation. Chamfered edges are desirable in glass and glass-like materials because they resist fracturing or chipping and eliminate sharp edges. Producing articles or features in articles in one manufacturing operation is desirable because it can save time and expense by eliminating the need to transfer the article to a separate machine for chamfering after laser machining. Alternatively, it can permit use of less expensive equipment because the same laser used for machining can be used to form the chamfer instead of having a separate process perform the chamfering. Producing chamfers with laser machining results in high quality chamfers without the need for a separate polishing or finishing step.

45 Claims, 9 Drawing Sheets

(56) References Cited

U.S. PATENT DOCUMENTS

| | | | |
|---|---|---|---|
| 6,326,589 | B1 | 12/2001 | Beersiek et al. |
| 6,521,862 | B1 | 2/2003 | Brannon |
| 6,634,186 | B2 | 10/2003 | Abe |
| 6,642,476 | B2 * | 11/2003 | Hamann .................... 219/121.7 |
| 6,642,477 | B1 | 11/2003 | Patel et al. |
| 6,756,563 | B2 | 6/2004 | Gross et al. |
| 6,795,274 | B1 | 9/2004 | Hsieh et al. |
| 6,820,330 | B1 | 11/2004 | Haba |
| 6,962,279 | B1 | 11/2005 | Marek et al. |
| 6,992,026 | B2 | 1/2006 | Fukuyo et al. |
| 7,007,512 | B2 | 3/2006 | Kamada et al. |
| 7,023,001 | B2 | 4/2006 | Cournoyer et al. |
| 7,060,933 | B2 * | 6/2006 | Burrowes et al. ........ 219/121.69 |
| 7,217,448 | B2 | 5/2007 | Koyo et al. |
| 7,378,342 | B2 | 5/2008 | Kirby et al. |
| 7,723,212 | B2 | 5/2010 | Yamamoto et al. |
| 8,075,999 | B2 | 12/2011 | Barefoot et al. |
| 2001/0035447 | A1 | 11/2001 | Gartner et al. |
| 2001/0038930 | A1 | 11/2001 | Yamamoto et al. |
| 2001/0040150 | A1 | 11/2001 | Suzuki |
| 2002/0005805 | A1 | 1/2002 | Ogura et al. |
| 2002/0033558 | A1 | 3/2002 | Fahey et al. |
| 2002/0041946 | A1 | 4/2002 | Abe |
| 2002/0060978 | A1 | 5/2002 | Hirotsume et al. |
| 2003/0044539 | A1 | 3/2003 | Oswald |
| 2003/0096078 | A1 | 5/2003 | Horisaka et al. |
| 2003/0102291 | A1 | 6/2003 | Liu et al. |
| 2003/0111447 | A1 | 6/2003 | Corkum et al. |
| 2003/0150839 | A1 | 8/2003 | Kobayashi et al. |
| 2003/0201261 | A1 | 10/2003 | Kang et al. |
| 2003/0217568 | A1 | 11/2003 | Koyo et al. |
| 2004/0104846 | A1 | 6/2004 | Ogura et al. |
| 2004/0200067 | A1 | 10/2004 | Ogura et al. |
| 2005/0042805 | A1 | 2/2005 | Swenson et al. |
| 2005/0087522 | A1 * | 4/2005 | Sun et al. ................. 219/121.71 |
| 2005/0184035 | A1 | 8/2005 | Kurosawa et al. |
| 2005/0221044 | A1 | 10/2005 | Gaume et al. |
| 2005/0223744 | A1 | 10/2005 | Horisaka et al. |
| 2006/0127640 | A1 | 6/2006 | Kobayashi et al. |
| 2006/0151450 | A1 | 7/2006 | You et al. |
| 2006/0169677 | A1 | 8/2006 | Deshi |
| 2007/0012665 | A1 | 1/2007 | Nelson et al. |
| 2007/0039932 | A1 | 2/2007 | Haase et al. |
| 2007/0170162 | A1 | 7/2007 | Haupt et al. |
| 2007/0262464 | A1 | 11/2007 | Watkins et al. |
| 2007/0291496 | A1 | 12/2007 | Nashner et al. |
| 2008/0047933 | A1 | 2/2008 | Salminen et al. |
| 2008/0093775 | A1 | 4/2008 | Menoni et al. |
| 2008/0128953 | A1 | 6/2008 | Nagai et al. |
| 2008/0185367 | A1 | 8/2008 | El-Hanany et al. |
| 2008/0283509 | A1 | 11/2008 | Abramov et al. |
| 2008/0290077 | A1 | 11/2008 | DeMeritt et al. |
| 2008/0296273 | A1 * | 12/2008 | Lei et al. ................. 219/121.71 |
| 2009/0020511 | A1 | 1/2009 | Kommera et al. |
| 2009/0045179 | A1 | 2/2009 | Williams |
| 2009/0201444 | A1 | 8/2009 | Yamabuchi et al. |
| 2009/0212030 | A1 | 8/2009 | Clifford, Jr. |
| 2010/0197116 | A1 | 8/2010 | Shah et al. |
| 2010/0206008 | A1 | 8/2010 | Harvey et al. |
| 2010/0243626 | A1 | 9/2010 | Baldwin |
| 2010/0320179 | A1 | 12/2010 | Morita et al. |
| 2011/0003619 | A1 | 1/2011 | Fuji |
| 2011/0240611 | A1 | 10/2011 | Sandström |
| 2011/0240616 | A1 | 10/2011 | Osako et al. |
| 2011/0250423 | A1 | 10/2011 | Fukasawa et al. |

FOREIGN PATENT DOCUMENTS

| | | |
|---|---|---|
| CN | 102356050 A | 2/2012 |
| DE | 10029110 B4 | 5/2006 |
| DE | 102006046313 B3 | 1/2008 |
| DE | 102007009786 A1 | 8/2008 |
| EP | 0321838 B1 | 2/1993 |
| JP | 11-163403 A | 6/1999 |
| JP | 2001-274441 | 5/2001 |
| JP | 2002-192369 A | 7/2002 |
| JP | 2002-241141 A | 8/2002 |
| JP | 2002-308637 A | 10/2002 |
| JP | 2004-299969 A | 10/2004 |
| JP | 2007-290011 A | 11/2007 |
| WO | WO 03/002289 A1 | 1/2003 |
| WO | WO2011117006 A1 | 9/2011 |

OTHER PUBLICATIONS

Jan. 8 2014 Office Action concerning corresponding Chinese Application No. 200980153523.7.

Jun. 5, 2013 Office Action concerning corresponding Chinese Application No. 200980153523.7.

Bradley Elkins Riley, "Evporative Etching for Non-Contact Glass Scribing Using a Single-Mode Ytterbium Fiber Laser", North Carolina State University, 2007, 96 pages.

J. Zhang et al., "High-Speed Machining of Glass Materials by Laser-Induced Plasma-Assisted Ablation Using a 532-nm Laser", Appl. Phys. A 67, 499-501, 1998.

Kunihito Nagayama et al. (2011), Pulse Laser Ablation by Reflection of Laser Pulse at Interface of Transparent Materials, Lasers—Applications in Science and Industry, Dr Krzysztof Jakubczak (Ed.), ISBN: 978-953-307-755-0, InTech, Available from: http://www.intechopen.com/books/lasers-applications-in-science-and-industry/pulse-laser-ablation-byreflection-of-laser-pulse-at-interface-of-transparent-materials.

Y. Hanada et al., "Laser-Induced Plasma-assisted Ablation (LIPAA): Fundamental and Industrial Applications", High-Power Laser Ablation VI, Proc. of SPIE vol. 6261, 626111-1 to -15 (2006).

Loeschner, U., et al. "Micromachining of glass with short ns-pulses and highly repetitive fs-laser pulses." Proceedings of the ICALEO. 2008. 9 pages.

M B Strigin, A N Chudinov, "Laser Processing of Glass by Picosecond Pulses", Quantum Electronics 24 (8) 732-735 (1994).

English translation of the Dec. 24, 2014 Office action concerning Chinese Pat. Appl. No. 200980153523.7, which corresponds with the subject U.S. Appl. No. 12/336,609.

English translation of the Dec. 12, 2014 Office action concerning Taiwan Pat. Appl. No. 098143094, which corresponds with the subject U.S. Appl. No. 12/336,609.

English translation of the Aug. 17, 2015 Office action concerning Chinese Patent Application No. 200980153523.7, which corresponds with the subject U.S. Appl. No. 12/336,609.

English translation of the Mar. 3, 2016 Office action concerning Chinese Patent Application No. 201380009726.5, which corresponds with U.S. Appl. No. 138779,050.

English translation of the Mar. 3, 2016 Office action concerning Chinese Patent Application No. 201380009726.5, which corresponds with U.S. Appl. No. 13/779,050.

English translation of the Feb. 22, 2016 Office action concerning Chinese Patent Application No. 200980153523.7, which corresponds with the subject U.S. Appl. No. 12/336,609.

\* cited by examiner

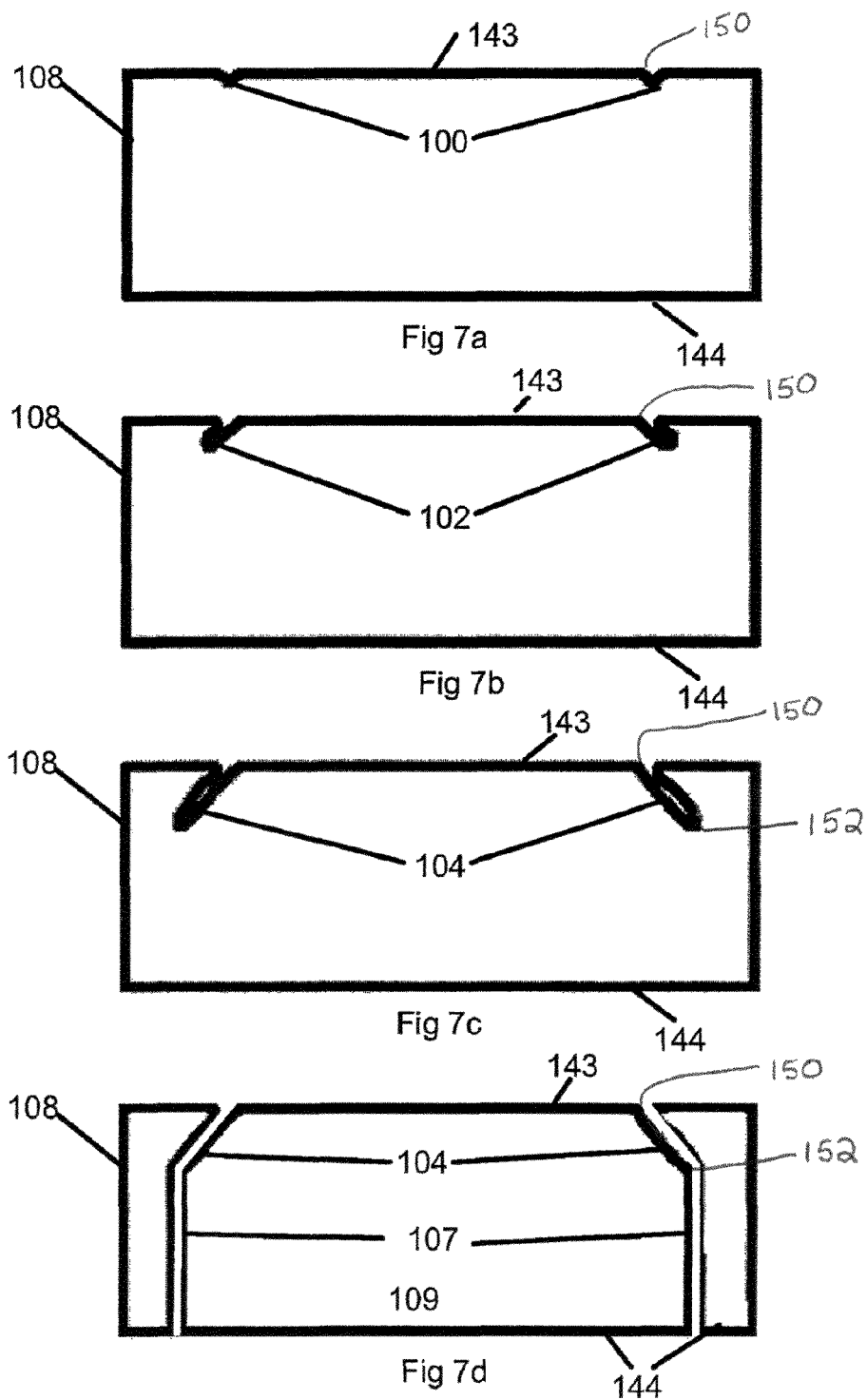

US 9,346,130 B2

METHOD FOR LASER PROCESSING GLASS WITH A CHAMFERED EDGE

FIELD OF THE DISCLOSURE

The field of the technical subject matter relates to laser machining glass or glass-like articles. In particular it relates to laser machining an article with a chamfer on an edge that adjoins the top or bottom surface of the article or on a feature laser machined into the article. In more particular it relates to laser machining glass or glass-like article with a chamfer in a single manufacturing operation

BACKGROUND OF THE INVENTION

Laser machining chamfered features in glass or glass-like articles such as sapphire, ceramic or glass ceramics is desirable because adding a chamfer to an edge makes the edge safer, in the sense that it is less likely to cause cuts or scratches when handled, makes it less likely to chip or crack and in general, makes the edge stronger. While chamfered edges are desirable, no methods exist for creating an article with a chamfered edge in one manufacturing operation. Prior art methods of producing chamfered edges involve creating a feature such as a through cut or trench in one operation and then producing a chamfer in one or more additional steps.

A chamfer is a bevel created on an edge formed by two adjoining surfaces. These surfaces typically are at approximately right angles at the edge where they adjoin, although other angles are possible. FIG. 1 shows a schematic cross-section of an article 10 produced without a chamfer. In this case the sides 24, 26 have been formed by machining the article from the top surface 20 to the bottom surface 22. Note the edges 12, 14, 16 and 18 where the top surface 20 and the bottom surface 22 adjoin the sides 24, 26. FIG. 2 shows the same article 10 except with chamfers 32, 34 applied to the edges where the top surface 20 adjoins the sides 24, 26. Note that chamfers could also be applied to the edges 18, 16 where the bottom surface 22 adjoins the sides 24, 26 in the place of or in addition to the top surface chamfers 32, 34. In addition to straight beveled chamfers as shown in FIG. 2, rounded chamfers are sometimes desirable. FIG. 3 shows the same article 10 with rounded chamfers 52, 54 where the top surface 20 adjoins the sides 24, 26.

Glass cutting has been traditionally realized by a mechanical saw approach, which scribes the glass and follows this step with a mechanical breaking process step. In recent years, laser technology has been adopted for glass cutting, which typically employs a laser as a localized heating source, sometimes accompanied by a cooling nozzle, to generate stress and microcracks along the trajectories described by the passage of the laser beam to cut the glass. Such resultant stress and microcracks may either be sufficient to cause the glass to fracture and separate along the designed trajectories or may require a follow-up breaking step to separate the glass. Existing technologies utilizing a laser only without the match of a cooling source include MLBA (Multiple Laser Beam Absorption) cutting technology as described in US patent applications 2007/0039932 Device for Separative Machining of Components made Form Brittle Material With Stress-Free Component Mounting and 2007/0170162 Method and Device for Cutting Through Semiconductor Materials, which use a near infrared (IR) laser source in combination with a pair of reflective mirrors to maximize the volume absorption of photon energy in the glass along the path to be separated so that there will be sufficient thermal stress generated so as to break the parts without needing to apply additional force. This technology, however, does require an initial mechanical notch to function as a pre-crack. The laser generated stress will make the initial crack propagate to form the separation. Another method of cutting glass or other brittle material is described in U.S. Pat. No. 5,609,284 Method of Splitting Non-Metallic Materials, which uses a $CO_2$ source to heat the glass following with a cooling nozzle to generate stress so as to initiate microcracks along the cutting path, and then applying a mechanical breaking step to separate the glass. None of these methods address forming a chamfer on the resulting edges.

Laser machining of glass and glass-like articles can be performed for the purpose of machining shapes into the surface, for instance machining depressions to hold liquids, or machining thru holes for applying controls such as push buttons to the article or to provide a via to pass electrical signals, fluid or light through the article. U.S. Pat. No. 6,143,382 Glass Substrate Having Fine Holes describes a method of drilling fine holes in glass but this method requires doping the glass with silver atoms to promote absorption of the laser energy. Another U.S. Pat. No. 6,756,563 System and Method for Forming Holes in Substrates Containing Glass, describes a method of forming holes in glass substrates. Neither of these approaches discusses forming a chamfer on the finished hole. US patent application 2006/0127640 Glass Substrate With Fine Holes And Method For Producing The Same discusses drilling holes in a glass substrate with a laser and subsequently using a wet etch with strong acid to form rounded edges on the holes, but this involves adding one or more operations which add additional operations and equipment to the manufacturing process. This prior art illustrates the difficulty in creating chamfers on features internal to the article, such as holes or other openings machined into the article. Chamfering these edges often requires specialized equipment and fixturing in addition to requiring additional manufacturing steps.

U.S. Pat. No. 6,521,862 Apparatus and Method for Improving Chamfer Quality of Disk Edge Surfaces With Laser Treatment describes a method for producing smooth chamfers on a glass disk by mechanically grinding the chamfers and then melting them slightly with a laser. This produces smooth chamfers but requires at least two extra manufacturing operations and at least two separate machines to achieve a chamfer of acceptable quality.

What is needed then is a method and apparatus for forming features in glass or glass-like articles which can form high quality beveled or curved chamfers on both external and internal laser cut edges in one manufacturing operation.

SUMMARY OF THE INVENTION

The instant invention is a method for forming chamfered features in glass or glass-like materials in one manufacturing operation. By one manufacturing operation we mean the article being processed is fixtured on a laser processing machine, the desired feature is laser machined into the article and one or more of the resultant feature edges are chamfered using the same laser processing equipment that formed the feature prior to the article being removed from the machine. While adding the chamfer in this fashion necessarily adds a step to the manufacturing operation, the additional time required is minimized because the chamfer is added while the article is still fixtured on the laser processing machine, thereby eliminating the need to remove the article from the machine, fixture the part on a different machine and then produce the chamfer. Producing a feature and chamfer in one operation eliminates the need to refixture the article and eliminate the need for an additional machine to perform the operation, thereby reducing the time and expense required to produce an article with chamfered edges. In the instant invention, the laser parameters can be varied to produce chamfers of different sizes and shapes without changing the equipment or fixturing. In addition, by varying the laser parameters appropriately, a desired level of surface smoothness and finish can be achieved without additional manufacturing operations or equipment.

An embodiment of the instant invention is shown in FIG. 4, a top-down view of an article 60 being laser machined from a blank 62 of glass or glass-like material. The dotted lines 64, 66, 68 are three representative paths to be followed by a laser beam. The laser beam would trace up to N paths, where N can vary between 1 and typically less than 100, around the article 60 to be machined between lines 64 and 68, varying the laser parameters to vary the depth of cut and thereby create a chamfer. The actual number of paths would depend on the desired size and finish of the chamfer. For some applications, along one or more of the paths the laser parameters would be adjusted to enable the laser to cut completely through the blank 62 to achieve complete separation of the article 60 from the blank 62. This would typically require more than one pass along the same path, varying the depth of focus to remove material from the bottom of the cut with each pass. In other applications, the laser paths and parameters could be adjusted to machine a chamfered feature such as a hole, a blind hole or other shape in the article, where the laser may or may not penetrate completely through the article 60. FIG. 5 shows a cross sectional view of the article 60 being laser machined from a blank 62, showing a cross section taken along line 70 from FIG. 4. FIG. 5 shows multiple laser beams 72, 74, 76 representing three of N possible paths impinging the blank 62 perpendicular to the top surface 78.

FIGS. 6 a, b, c and d show the progression of cuts made by the laser beams in the blank 62, from a chamfer beginning 150 of a beginning chamfer 90 to a chamfer end 152 of a completed chamfer 94. FIG. 6 a shows the beginning chamfer 90 in the blank 62 after the first one or more laser cuts by the laser following paths as shown in FIGS. 4 and 5. FIG. 6 b shows the chamfer 92 after more laser cuts along paths. FIG. 6 c shows the completed chamfer 94. In FIG. 6 d the laser beam has cut through the blank 62 to form the article 60 with appropriate chamfers on the edges. Note that the chamfer in this case is asymmetric, with the bevel towards the article 60. By varying the laser parameters and the paths, the chamfer can be made symmetric, or made smaller or larger or curved as desired. This method works with materials that are transparent or opaque to the wavelength of laser radiation used to machine the materials.

FIGS. 12 a and b show an embodiment of the current invention being used to form chamfers in materials transparent to laser radiation of the wavelength used. In this method, the laser beam 142 is focused so as to concentrate laser energy sufficient to ablate material initially at the surface 143 of the bulk material 146 at a constant angle α (alpha). The laser beam is angled with respect to the surface but kept perpendicular to the path 140. As the chamfer is machined into the bulk material 146 the focal point is set to be a constant distance from the bottom of the kerf as it progresses through the material being machined, rather than at the machining surface. Since the material is transparent to laser radiation, only the material at the focal point is ablated. By changing the focal point to a greater depth in the material as the path is changed, an angled cut can be made in the material, from the chamfer beginning 150 of a beginning chamfer 100 to the chamfer end 152 of a completed chamfer 104. FIG. 7 a shows the beginning chamfer 100 made by focusing the laser beam at the surface of the transparent material 108. FIG. 7 b shows the chamfer 102 being cut more deeply into the material by focusing the laser beam below the surface of the material and moving along a path as in FIGS. 4 and 5. In FIG. 7 c the chamfer 104 is complete. In FIG. 7 d the laser is moved along a path directly one or more times over the cut 107 beginning at the end 152 of chamfer 104. The laser is focused more deeply with each pass over the cut 107 until the article 109 is separated from the bulk material 108. Note that in the case of materials transparent to the wavelength of laser radiation used, the chamfer could be machined into the bottom surface of the article (FIGS. 6e and 7e) or both the top and bottom surfaces of the article (FIGS. 6f and 7f). This is accomplished by adjusting the laser beam focal spot to be within the material being machined. By adjusting the laser parameters so that the fluence of the laser beam is lower than the ablation threshold of the material except at the focal spot, where the fluence of the beam in $J/cm^2$ is greater than the ablation threshold.

A further embodiment of the instant invention is shown in FIGS. 8a and b. In this embodiment the laser beam is moved along paths as shown in FIG. 4, however, the angle at which the laser impinges the material is varied with the location of the path on or in the material. FIG. 8a shows three representative laser beams and angles, with laser beam 110 at angle α1, laser beam 112 at angle α2 and laser beam 114 at angle αN, where N is an integer and angle αN>α2>α1. FIG. 8b shows a top-down view with one representative path 116 shown on the bulk material 118. The arrows, one of which is indicated 119, on the path indicate that the angle that the laser beam impinges the material 118 is always perpendicular to the path 116 as the article 117 is machined from the bulk material 118. The advantage of this approach is that it permits better control over the quality of the finish of the chamfer with fewer passes, but requires an apparatus that is able to control the angle of the laser beam with respect to the workpiece.

FIG. 9 shows a further embodiment of the instant invention. FIG. 9 is a side view showing laser beams 120, 122, and 124 impinging on bulk material 128. In this embodiment, the mechanism (not shown) moving the laser beam along a path with respect to the material does not change its path, rather the angle at which the laser beam is directed to the material is altered. The laser beam is pivoted about point 126 as it travels around a path on the bulk material 128, but only in a plane perpendicular to the path. This allows more control over the shape and size of the chamfer, but at the cost of slightly more complex mechanism. FIG. 10 shows a chamfer 130 machined into bulk material 128 using this method. FIG. 11 shows an article 129 separated from bulk material 128 by machining cuts 132 which extend from the bottom of the chamfer to the bottom of the material 128 by machining the material with a laser beam 121 which is perpendicular to the surface.

FIG. 12 a shows another embodiment of the instant invention. This embodiment works with materials that are transparent to the wavelengths of light used to machine the material. As shown in FIG. 12 a, the laser beam (not shown) is moved along a path 140 on the bulk material 146. The arrows indicate that the angle the laser beam has with respect to the material is always perpendicular to the path. FIG. 12 b shows the laser beam 142 at an angle α with respect to the material. FIGS. 7 a-d show a chamfer 100, 102, and 104 laser machined into the material by focusing the laser more and more deeply with each pass along the path, thereby ablating material and machining the chamfer. The chamfer could be machined into either the top surface 143 or the bottom surface 144 (FIG. 7e) or both the top surface 143 and the bottom surface 144 (FIG. 7f). The advantage of this approach is that in the case of transparent materials, the angle of the laser with respect to the workpiece would not have to be altered while machining, making the apparatus required to implement this method simpler and less expensive to build. Also, less material is remove with this approach, thereby speeding the process.

BRIEF DESCRIPTION OF THE DRAWINGS

FIG. 7a shows the beginning of a chamfer laser machined into transparent material.
FIG. 7b shows further laser machining of a chamfer in transparent material.
FIG. 7c shows completed laser machining of a chamfer in transparent material.
FIG. 7d shows a laser machined chamfer in transparent material with final separating cuts.
FIG. 12b shows an example angle used in the embodiment from FIG. 12a.

DETAILED DESCRIPTION OF THE PREFERRED EMBODIMENTS

One of the goals of the instant invention is to permit laser machining of chamfered features in glass or glass-like materials in one manufacturing operation. An exemplary machine that can produce a and control a laser beam capable of ablating glass and glass-like materials, fixture the materials and move the laser beam(s) with respect to the material is the MM5800 laser micromachining system produced by Electro Scientific Industries, Inc., Portland, Oreg., the assignee of the instant invention.

The laser beam can be either continuous wave (CW) or pulsed. Laser parameters which are controlled to provide the desired ablation rate include wavelength, average power, spatial distribution, spot size and speed of travel. In the case of pulsed lasers, pulse width, pulse energy, pulse temporal distribution and repetition rate can be controlled to provide the desired ablation. Laser wavelengths can range from infrared (IR), such as 10.6 micron wavelengths emitted by $CO_2$ lasers down to frequency tripled or quadrupled solid state laser which operate in the ultraviolet (UV) range below 355 nm. Average power can range up to tens of Watts. Spatial distribution can either be Gaussian, modified or clipped Gaussian or shaped distributions such as "top hat" or annular. See for example U.S. Pat. No. 6,791,060 Beam Shaping and Projection Imaging with Solid State UV Gaussian Beam to Form Vias, assigned to the assignee of the instant invention. Spot sizes can typically range from a few microns to more than 100 microns. Exemplary rates of travel for the laser beam with respect to the material surface being ablated can range from a few mm/s to 500 mm/s depending upon the amount of material to be removed. For pulsed lasers, pulse width can range from femtosecond pulses up to tens of nanoseconds. Pulse energy can range from a few microJoules per pulse to hundreds of milliJoules, depending upon the pulse width. Pulses can have Gaussian temporal distribution or be shaped or sliced to have faster rise and/or fall time. Pulses can also be produced with more complex tailored temporal distribution. For an example of this type of pulse see U.S. Pat. No. 7,348,516 Methods of and Laser Systems for Link Processing using Laser Pulses With Specially Tailored Power Profiles, assigned to the assignee of the instant invention. The repetition rate of pulsed lasers used for this purpose can range from a few kHz to over 1 MHz.

Figure 1:
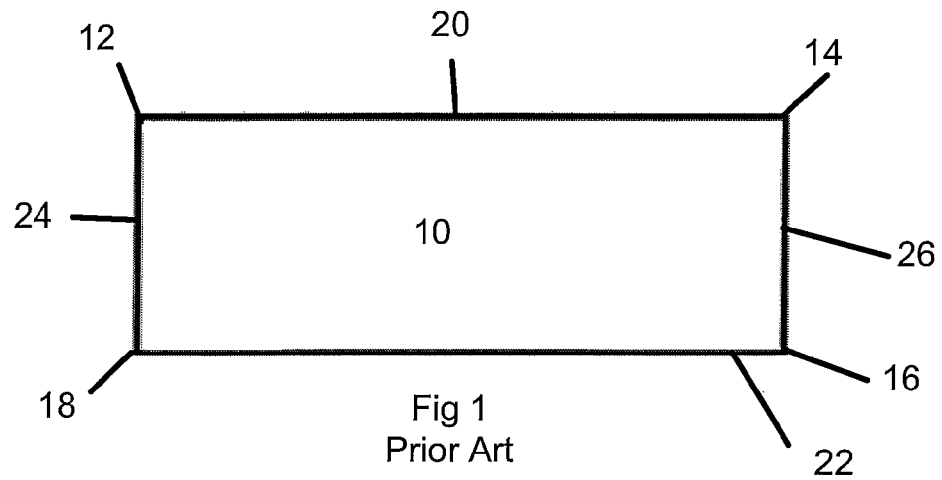
FIG. 1 (Prior Art) shows an article following laser machining.
Figure 2:
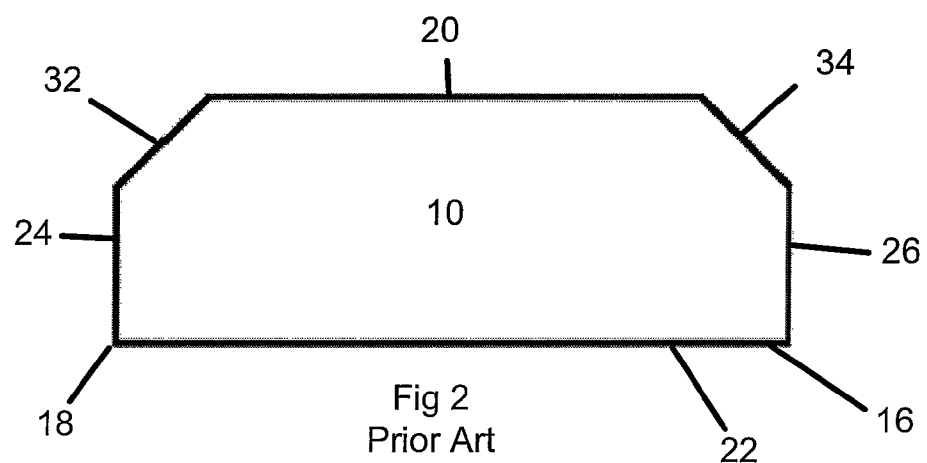
FIG. 2 (Prior Art) shows an article following laser machining and chamfering.
Figure 3:
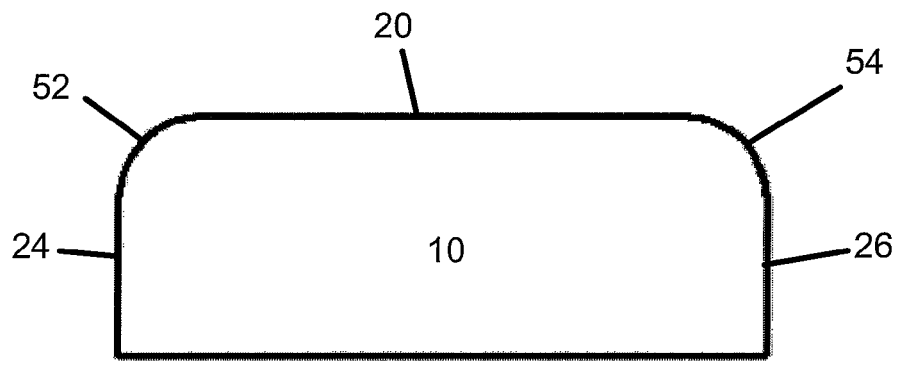
FIG. 3 (Prior Art) shows an article following laser machining and chamfering with a rounded chamfer.
Figure 4:
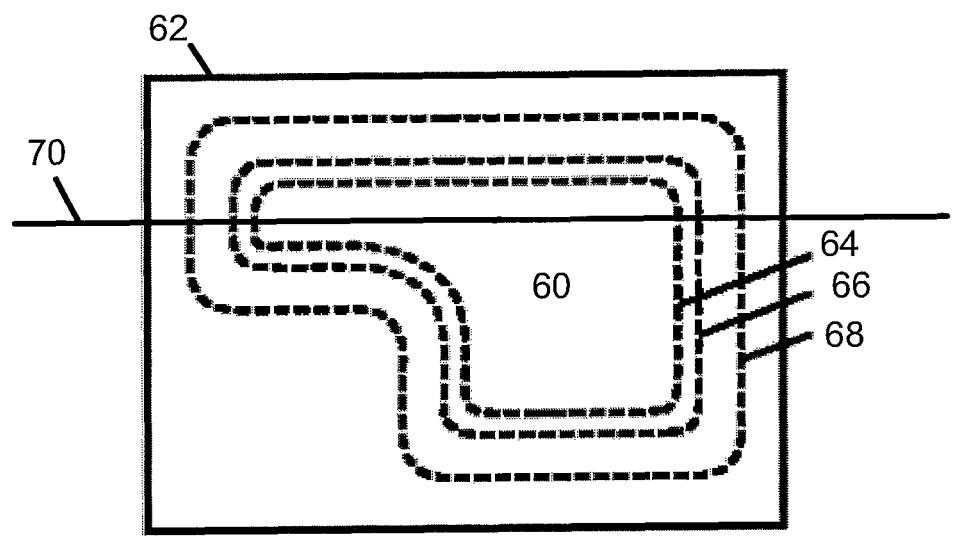
FIG. 4 shows exemplary paths for laser machining chamfers in one manufacturing step.
Figure 5:
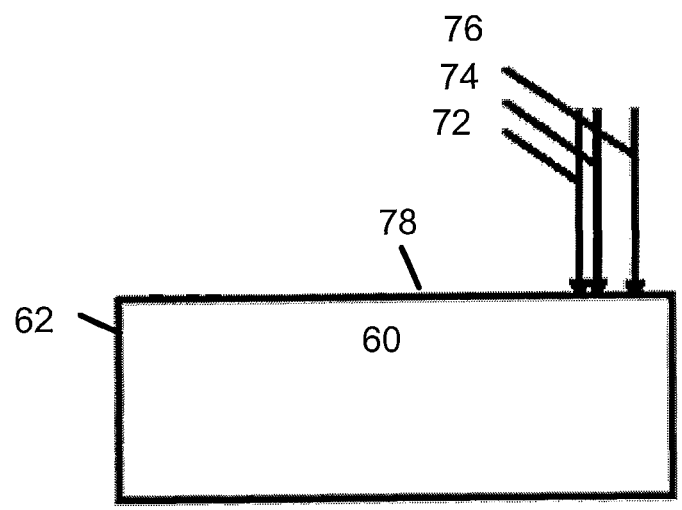
FIG. 5 shows laser beams impinging perpendicularly on material to be laser machined.
Figure 6A:
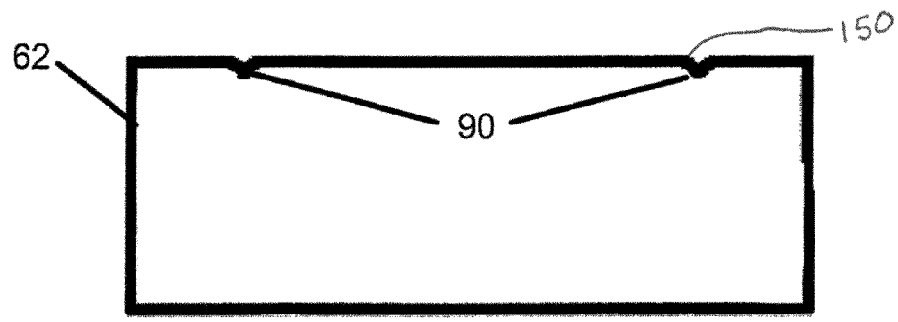
FIG. 6a shows the beginning of a laser machined chamfer.
Figure 6B:
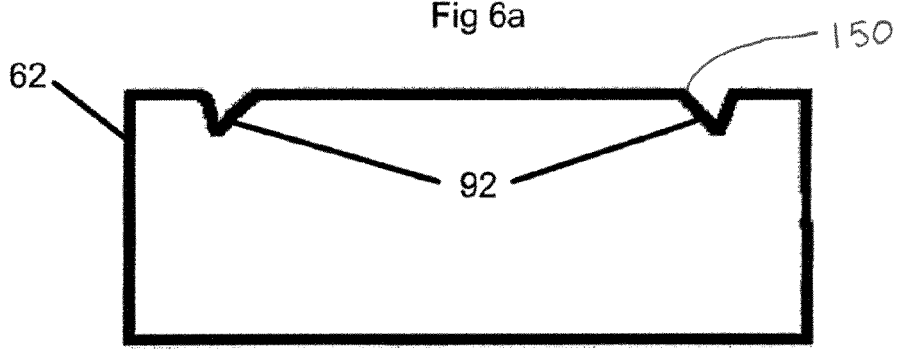
FIG. 6b shows further laser machining of a chamfer.
Figure 6C:
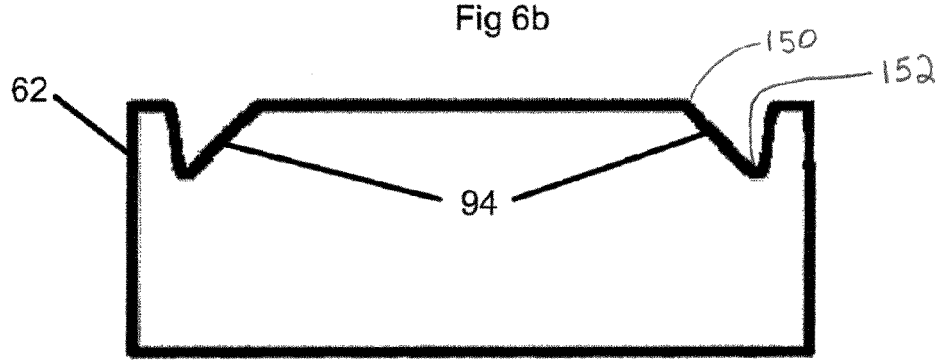
FIG. 6c shows a complete laser machined chamfer.
Figure 6D:
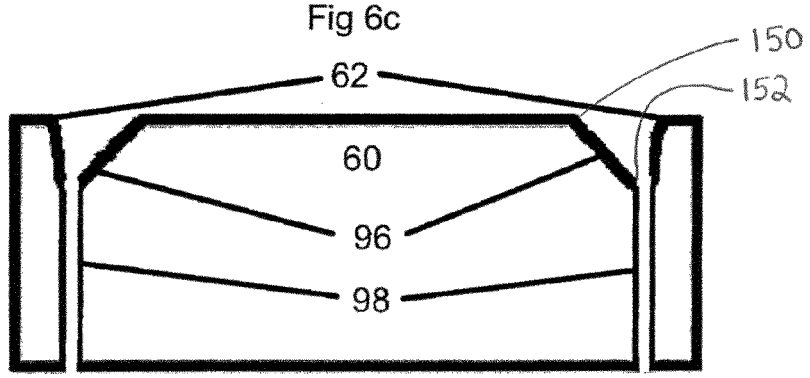
FIG. 6d shows a laser machined chamfer with final separating cuts.
Figure 6E:
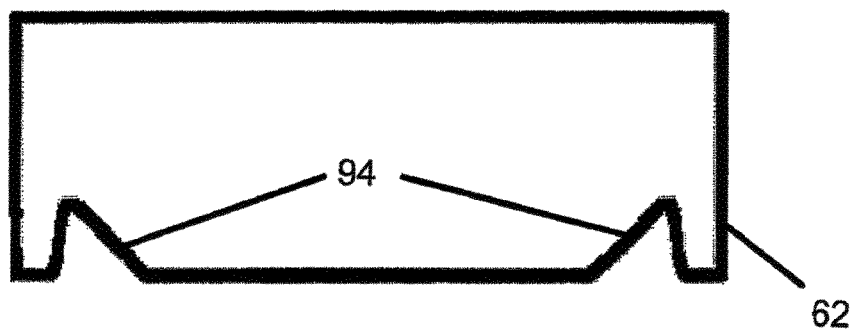
FIG. 6e shows a chamfer machined into a bottom surface of transparent material.
Figure 6F:
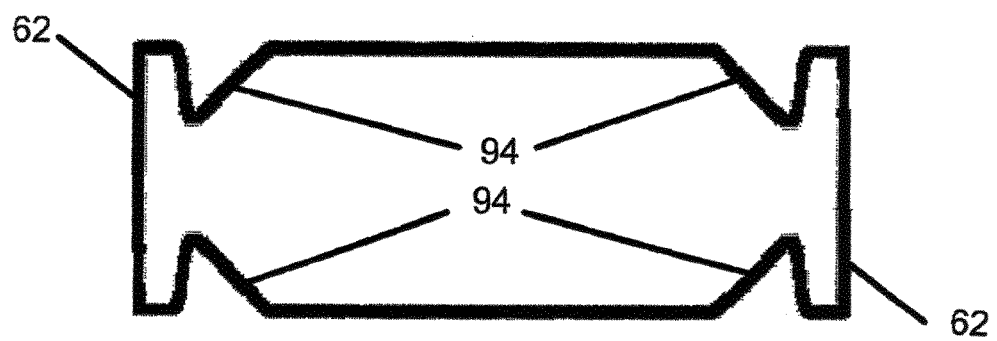
FIG. 6f shows chamfers machined into top and bottom surfaces of transparent material.

In one embodiment of the instant invention, referring to FIGS. 4 and 5, an article 60 is to be machined from a blank 62 of glass or glass-like material. The assumption is that this material is opaque to the wavelength of laser light used. A laser beam 72 is directed perpendicular to the top surface 78 of a blank 62 and focused so that the laser power exceeds the ablation threshold of the material to be machined at the point where the laser beam impinges the material. Once the laser parameters are selected to provide the desired ablation rate, the laser beam is then directed to begin ablating material along a path 64 parallel to the final through-cut which will separate the article 60 from the blank 62. The laser beam is directed to follow this path one or more times until the desired amount of material is ablated. The result of this is shown in FIG. 6a as beginning chamfers 90. The laser beam is the directed to follow a path adjacent to the one previously followed, for example path 66, to ablate more material. In order to form a chamfer, the laser parameters are adjusted to ablate more material with each adjacent pass. For example, the laser power could be increased, the pulse width could be increased, or the number of passes around the path could be increased or some combination of these or other parameter changes could be controlled to form the chamfer. This is shown in FIG. 6b as intermediate chamfer 92. This is repeated until a path such as path 68 is reached, yielding the result shown in FIG. 6c as completed chamfer 94. At this point the laser is directed to complete separating the article 60 from the blank 62 by laser ablating a cut 98 through the material to complete the separation.

Figure 7E:
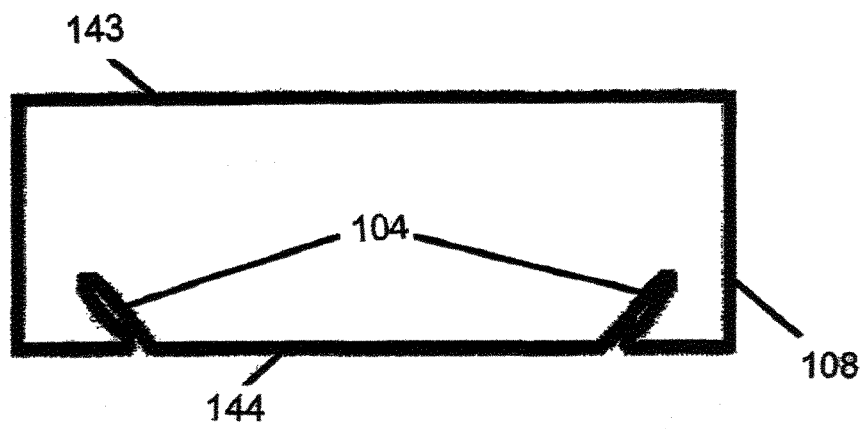
FIG. 7e shows a chamfer machined into a bottom surface of transparent material.
Figure 7F:
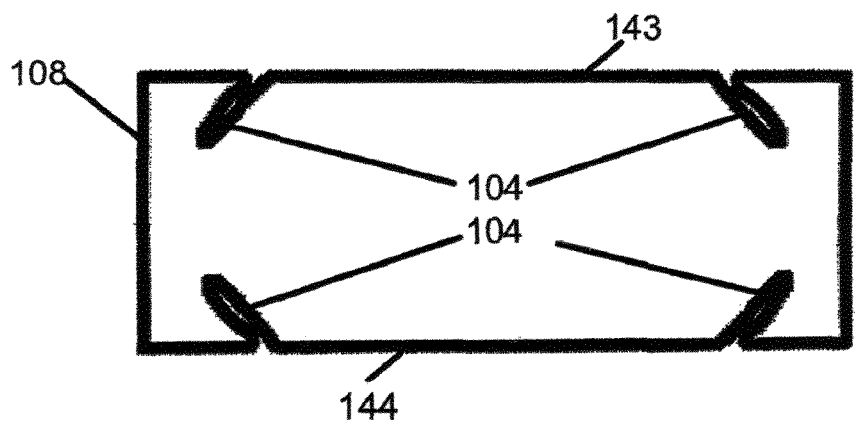
FIG. 7f shows chamfers machined into top and bottom surfaces of transparent material.
Figure 12A:
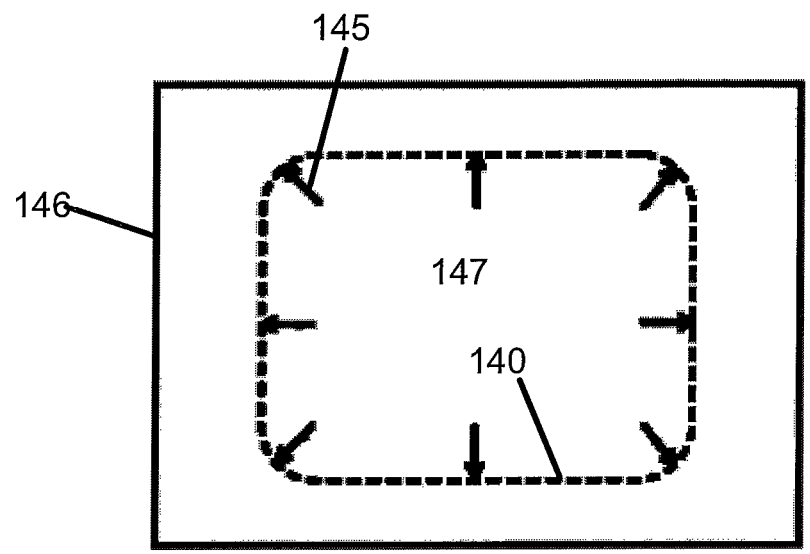
FIG. 12a shows another embodiment using an angled laser beam along a single path to machine chamfers.
Figure 12B:
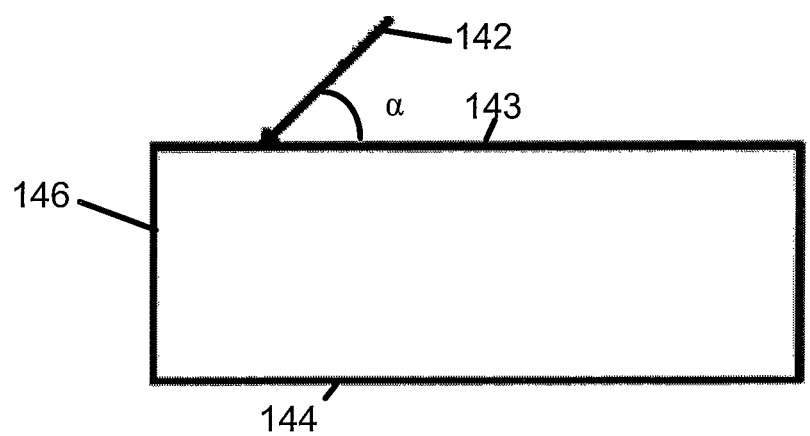

FIGS. 12 a and b illustrate another embodiment of the instant invention. This embodiment requires that the glass or glass-like material be transparent to the wavelength of laser radiation used to ablate the material 146. In this embodiment the laser follows a single path 140 around the article 147 to be chamfered. The laser beam 142 is angled to match the angle α of the desired chamfer with respect to the surface 143 of the bulk material 146. The arrows, one of which is indicated 145, on the path 140 indicate that the laser beam is held to be perpendicular to the path 140 while being angled with respect to a surface 143 of the bulk material 146. Machining a chamfer may require several passes around the path by the laser beam 142. This embodiment requires that the laser beam parameters be adjusted so as to make the laser beam fluence, measured in J/cm², greater than the ablation threshold of the material only at the focal spot and not elsewhere within the beam. With each pass the laser focal point is adjusted to be deeper in the material as the material is removed so as to ablate material at the bottom of the kerf. FIGS. 7 *a-d* illustrate this process. In FIG. 7 *a* the first pass has begun machining the chamfer 100. In FIG. 7 *b* the focal point of the laser beam 142 is adjusted to move the ablation point deeper into the material as more passes around the path 140 are taken to machine more material from the bottom of the kerf 102 that will form the chamfer. In FIG. 7 *c*, after additional passes around the path 140, the kerf 104 forming the chamfer is complete. In FIG. 7 *d*, the laser beam focal spot (not shown) is adjusted to move perpendicular to the surface 143 of the material 109 to form the cut 107 which separates the article 109 from the bulk material 108 as the laser beam is focused deeper into the material 109 with each pass. Note that in the case of material that is transparent to the wavelength of laser radiation used, the cuts may form a chamfer on the bottom surface 144 of the article 109 (FIG. 7*e*) or both the top surface 143 and the bottom surface 144 (FIG. 7*f*).

Figure 8A:
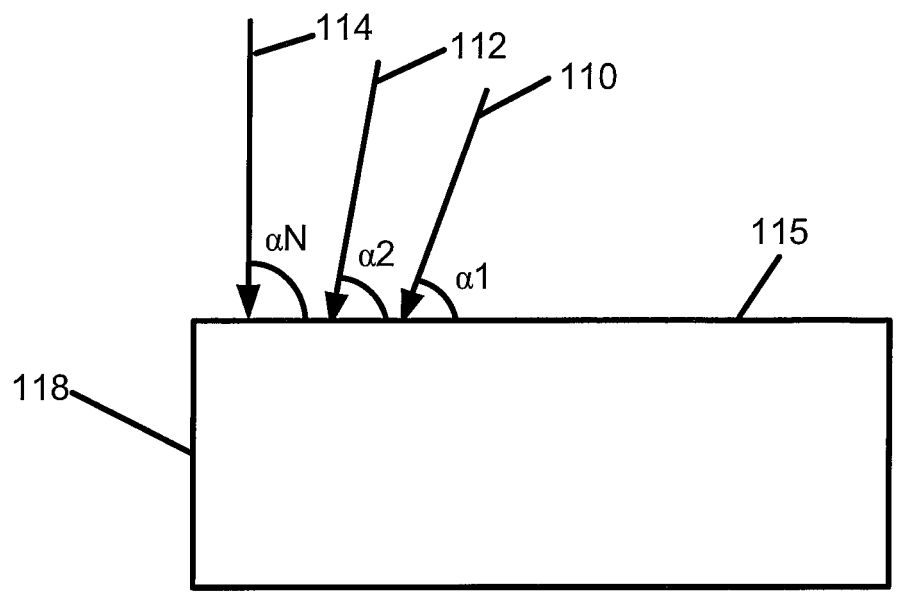
FIG. 8a shows a further embodiment of the instant invention using angled laser beams.
Figure 8B:
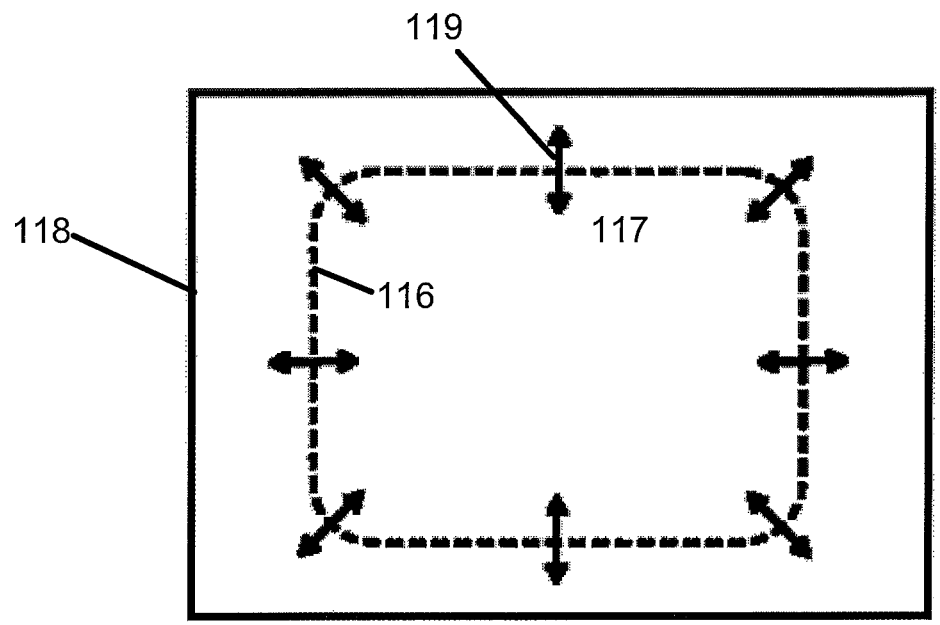
FIG. 8b shows how angled laser beams are arranged with respect to the laser beam paths.

In yet another embodiment of the instant invention a laser beam makes multiple passes along multiple adjacent paths to form a chamfer, changing the angle at which the laser beam impinges the material as the path changes. As shown in FIG. 8*a*, laser beams 110, 112 and 114 show how the angle with which the laser beam impinges the bulk material 118 changes with respect to the top surface 115. As shown in FIG. 8*a*, as the path moves from the beginning of the chamfer to the outside edge, the angle at which the laser beam impinges the surface changes from angle α1 for laser beam 110 through angle α 2 for laser beam 112 to angle α N for laser beam 114, where N is an integer and N equals the number of paths followed around the top surface 115, where αN>α2>α1. FIG. 8*b* shows a top view of this embodiment, showing a sample path 116 separating the bulk material 118 from the article to be machined 117, with the arrows indicating that the laser beam is at an angle to the top surface 115 but perpendicular to the path 116. This embodiment can make it easier to form curved or multiple beveled chamfers but requires additional equipment to vary the angle of the laser beam with respect to the workpiece in a controlled fashion.

Figure 9:
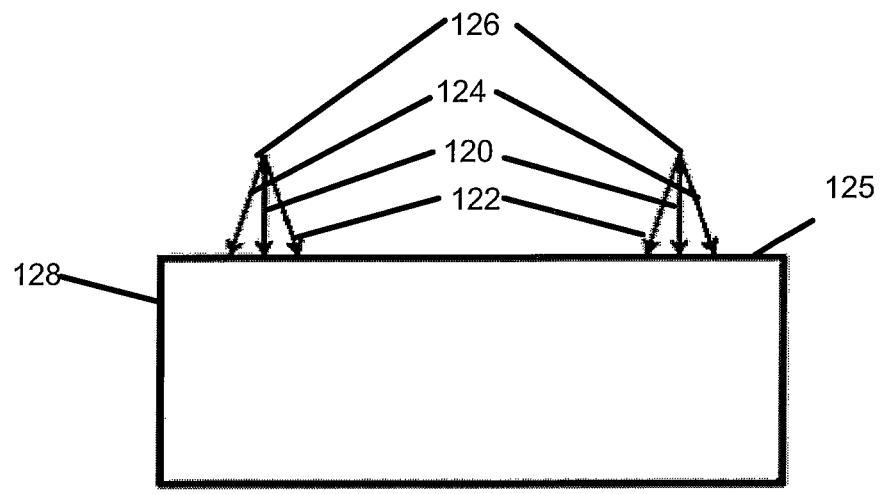
FIG. 9 shows another embodiment of the instant invention using angled laser beams that share a single path.
Figure 10:
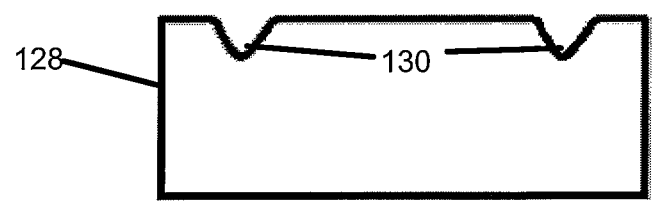
FIG. 10 shows laser machined chamfers.
Figure 11:
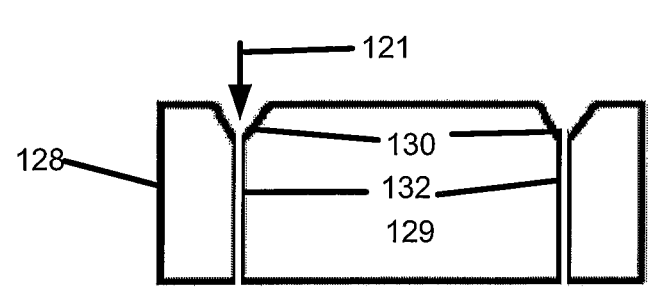
FIG. 11 shows laser machined chamfers with a final cut.

In yet another embodiment of the instant invention, the laser beam angle is varied with respect to the workpiece. In this embodiment, the equipment that changes the angle of the laser beam with respect to the workpiece is designed to change the angle of the laser beam in a plane about a point at a fixed distance from the workpiece. In addition, the equipment that changes the angle will rotate to keep the plane within which the laser beam changes angle perpendicular to the path that the laser beam follows on the workpiece. This arrangement will be made clearer by referring to FIG. 9. In FIG. 9, the laser beam 120, 122, 124 changes angle about a point 126. The point 126 is moved with respect to the bulk material 128 along a path (not shown), maintaining a fixed relationship between the point 126 and the surface of the material 125 so that the point 126 is directly above the path. Several passes are then made, with the laser beam 120, 122, 124 changing angle as the chamfer is machined. The laser beam focal point is changed as material is removed to maintain the focal point at the surface of the bulk material 128. FIGS. 10 and 11 show a chamfer 130 machined with this embodiment. The cut that separates the article 129 from the bulk material 128 is made by holding the laser beam 121 perpendicular to the surface of the material 125 and making passes around the path until the article 129 is separated from the bulk material 128 by a cut 132.

It will be obvious to those having skill in the art that many changes may be made in the details of the above described embodiments of the instant invention without departing from the underlying principles thereof. The scope of the instant invention should, therefore, be determined only by the following claims.

What is claimed:

1. A method comprising:
providing a workpiece including a bulk material and having a top surface and a bottom surface;
forming a chamfer within said bottom surface, wherein forming said chamfer includes:
providing a laser machining system including a laser operable to emit a laser beam having a wavelength, wherein said laser machining system also includes beam optics operable to focus said laser beam to a focal spot;
determining laser parameters for producing said focal spot suitable forming a chamfer within said bottom surface, wherein said bulk material is substantially transparent to said wavelength of said laser beam and has a fluence ablation threshold, wherein said laser beam has a laser beam fluence that is lower than said fluence ablation threshold of said bulk material except at said focal spot, and wherein said laser parameters cooperate with said beam optics to provide a focused fluence at said focal spot that is greater than said fluence ablation threshold of said bulk material;
generating said laser beam;
directing said laser beam onto said top surface of said workpiece; and
moving said laser beam in relation to said workpiece to translate said laser beam across said top surface along a plurality of separate paths to form said chamfer in said bottom surface of said workpiece, wherein said plurality of separate paths includes first and second paths, wherein along said first path said focal spot is focused at said bottom surface such that said focal spot provides said focused fluence sufficient to remove bulk material from said bottom surface to form a kerf in said bottom surface of said workpiece, and wherein along said second path said focal spot is changed to be more deeply within said bulk material with respect to said bottom surface such that said focal spot provides said focused fluence sufficient to remove bulk material to extend said kerf more deeply into said bulk material.

2. The method of claim 1, wherein a second chamfer is formed in said top surface.

3. The method of claim 1 wherein directing said laser beam comprises directing said laser beam to intersect said workpiece substantially perpendicular to said top surface or said bottom surface of said workpiece.

4. The method of claim 1 wherein directing said laser beam comprises directing said laser beam to intersect said workpiece at one or more angles between substantially parallel and substantially perpendicular to said top surface of said workpiece and substantially perpendicular to said paths thereby forming a straight bevel chamfer.

5. The method of claim 1 wherein directing said laser beam comprises directing said laser beam to intersect said workpiece at one or more angles between substantially parallel and substantially perpendicular to said top surface of said workpiece and substantially perpendicular to said paths thereby forming a curved chamfer.

6. The method of claim 1, wherein said kerf has a kerf bottom that increases in depth during each translated pass of the of said laser beam along said separate paths, and wherein said focal spot has a distance from said kerf bottom that is set to be constant as said kerf bottom increases in depth.

7. The method of claim 1, wherein directing said laser beam comprises directing said laser beam to intersect said workpiece at one or more angles between substantially parallel and substantially perpendicular to said top surface of said workpiece and substantially perpendicular to said paths, wherein said first path comprises an inner path and said second path comprises an outer path, wherein said laser beam intersects said workpiece at a first angle along said inner path and at a second angle along said outer path, and wherein said second angle is greater than said first angle.

8. The method of claim 7, wherein the separate paths include a middle path between the inner and outer paths, and wherein said laser beam intersects said workpiece at a third angle along the middle path that is greater than the first angle and smaller than the second angle.

9. The method of claim 1, wherein the laser parameters applied along said second path differ from the laser parameters applied along said first path.

10. The method of claim 9, wherein said first path comprises an inner path and said second path comprises an outer path, and wherein said laser parameters are adjusted to ablate more material per pass along said outer path.

11. The method of claim 1, wherein the laser beam is directed to the separate paths at separated times.

12. The method of claim 1, wherein said chamfer has a chamfer beginning and a chamfer end, wherein said kerf extends from said chamfer beginning to said chamfer end such that said kerf extends from said bottom surface at a kerf angle between substantially parallel and substantially perpendicular to said bottom surface to match a desired chamfer angle of said chamfer, and wherein said bottom surface underlies said chamfer end of said kerf.

13. The method of claim 1, wherein said first path comprises an inner path and said second path comprises an outer path.

14. The method of claim 1, wherein said second path is adjacent to said first path.

15. The method of claim 1, wherein directing said laser beam comprises directing said laser beam to intersect said workpiece at a constant angle between substantially parallel and substantially perpendicular to said top surface of said workpiece and substantially perpendicular to said paths.

16. The method of claim 1, wherein said chamfer is asymmetric.

17. The method of claim 1, wherein generating said laser beam employs a $CO_2$ laser.

18. The method of claim 1, wherein said laser beam comprises a Gaussian beam.

19. The method of claim 1, wherein said Gaussian beam is modified, clipped, or shaped.

20. The method of claim 1, wherein said chamfer has a chamfer beginning and a chamfer end, wherein said kerf extends from said chamfer beginning to said chamfer end such that said kerf extends from said bottom surface at a first kerf angle between substantially parallel and substantially perpendicular to said bottom surface to match a desired chamfer angle of said chamfer, wherein directing said laser beam also comprises directing said laser beam to intersect said top surface of said workpiece to form a second kerf at a second kerf angle that is different from the first kerf angle and is substantially perpendicular to said top surface of said workpiece.

21. The method of claim 20, wherein said second kerf extends to said top surface to separate a chamfered article from said bulk material.

22. A method for forming a chamfer and making a second cut in a workpiece having a top surface and a bottom surface, the method comprising:
    directing a laser beam having a wavelength onto said workpiece such that said laser beam has a fluence in a spot within said workpiece sufficient to remove material from said workpiece, wherein said workpiece is substantially transparent to said wavelength of said laser beam; and
    moving said laser beam in relation to said workpiece to translate said spot across said workpiece along a plurality of paths, including first and second paths, such that an angle at which said laser beam intersects said top surface of said workpiece is in a range between substantially parallel and substantially perpendicular to said surface and substantially perpendicular to said paths, wherein directing said laser beam comprises directing said laser beam to intersect said top surface of said workpiece at a first angle between substantially parallel and substantially perpendicular to said top surface of said workpiece and substantially perpendicular to said first path during one or more first passes to form a first cut extending from said one of said top and bottom surfaces into said bulk material to form said chamfer within at least one of said top surface and said bottom surface, wherein directing said laser beam also comprises directing said laser beam to intersect said top surface of said workpiece at a second angle substantially perpendicular to said top surface of said workpiece and substantially perpendicular to said second path during one or more second passes to form a second cut initiating at and extending from said first cut into said bulk material, wherein said first and second angles are different, and wherein said second cut is interior to said one of said top and bottom surfaces.

23. The method of claim 22 wherein said chamfer is formed in said bottom surface.

24. The method of claim 23, wherein directing said laser beam also comprises directing said laser beam toward said top surface of the workpiece to form a second chamfer within said bottom surface.

25. The method of claim 22, wherein said first cut at said first angle forms said chamfer in said top surface, wherein said second angle of said second cut is perpendicular to said top surface, and wherein said second cut extends through said bottom surface.

26. The method of claim 22, wherein the first and second paths include at least an inner path and an outer path, wherein said laser beam intersects said workpiece at a third angle along the inner path and at a fourth angle along the outer path, and wherein the fourth angle is greater than the third angle.

27. The method of claim 22, wherein the laser beam is directed along the first and second paths at separated times.

28. A method for forming a chamfer in a workpiece including a bulk material and having a top surface and a bottom surface, the method comprising:
    providing a laser machining system including a laser operable to emit a laser beam having a wavelength, wherein said laser machining system also includes beam optics operable to focus said laser beam to a focal spot;
    determining laser parameters for producing said focal spot suitable forming a chamfer within said top surface, wherein said bulk material is substantially transparent to said wavelength of said laser beam and has a fluence ablation threshold, wherein said laser beam has a laser beam fluence that is lower than said fluence ablation threshold of said bulk material except at said focal spot, and wherein said laser parameters cooperate with said beam optics to provide a focused fluence at said focal spot that is greater than said fluence ablation threshold of said bulk material;

generating said laser beam;

directing a laser beam onto said top surface of said workpiece; and moving said laser beam in relation to said workpiece to translate said laser beam across said top surface along a plurality of separate paths, wherein said plurality of separate paths includes first and second paths, wherein along said first path said focal spot is focused at said top surface such that said focal spot provides said focused fluence sufficient to remove bulk material from said top surface to form a kerf in said top surface of said workpiece, and wherein along said second path said focal spot is changed to be more deeply within said bulk material with respect to said top surface such that said focal spot provides said focused fluence sufficient to remove bulk material to extend said kerf more deeply into said bulk material, wherein said chamfer has a chamfer beginning and a chamfer end, wherein said kerf extends from said chamfer beginning to said chamfer end such that said kerf extends from said top surface at a kerf angle between substantially parallel and substantially perpendicular to said top surface to match a desired chamfer angle of said chamfer, and wherein said top surface overlies said chamfer end of said kerf.

29. The method of claim 28, wherein said first path comprises an inner path and said second path comprises an outer path, wherein said laser beam intersects said workpiece at a first angle along said first path and at a second angle along said second path, and wherein said second angle is greater than said first angle.

30. The method of claim 29, wherein the separate paths include a middle path between the inner and outer paths, and wherein said laser beam intersects said workpiece at a third angle along the middle path that is greater than the first angle and smaller than the second angle.

31. The method of claim 28, wherein the laser beam is directed to the separate paths at separated times.

32. The method of claim 28, wherein a second chamfer is formed in said bottom surface.

33. The method of claim 28, wherein directing said laser beam comprises directing said laser beam to intersect said workpiece substantially perpendicular to said top surface of said workpiece.

34. The method of claim 28, wherein said kerf has a kerf bottom that increases in depth during each translated pass of said laser beam along said separate paths, and wherein said focal spot has a distance from said kerf bottom that is set to be constant as said kerf bottom increases in depth.

35. The method of claim 28, wherein the laser parameters applied along said second path differ from the laser parameters applied along said first path.

36. The method of claim 28, wherein said first path comprises an inner path and said second path comprises an outer path, and wherein said laser parameters are adjusted to ablate more material per pass along said outer path.

37. The method of claim 28, wherein said second path is adjacent to said first path.

38. The method of claim 28, wherein directing said laser beam comprises directing said laser beam to intersect said workpiece at a constant angle between substantially parallel and substantially perpendicular to said top surface of said workpiece and substantially perpendicular to said paths.

39. The method of claim 28, wherein said chamfer is asymmetric.

40. The method of claim 28, wherein generating said laser beam employs a $CO_2$ laser.

41. The method of claim 28, wherein said laser beam comprises a Gaussian beam.

42. The method of claim 28, wherein said Gaussian beam is modified, clipped, or shaped.

43. The method of claim 28, wherein said chamfer has a chamfer beginning and a chamfer end, wherein said kerf extends from said chamfer beginning to said chamfer end such that said kerf extends from said top surface at a first kerf angle between substantially parallel and substantially perpendicular to said top surface to match a desired chamfer angle of said chamfer, wherein directing said laser beam also comprises directing said laser beam to intersect said top surface of said workpiece to form a second kerf at a second kerf angle that is different from the first kerf angle and is substantially perpendicular to said top surface of said workpiece.

44. The method of claim 43, wherein said second kerf extends to said bottom surface to separate a chamfered article from said bulk material.

45. A method for forming a chamfer in a workpiece including a bulk material and having a top surface and a bottom surface, the method comprising:

providing a laser machining system including a laser operable to emit a laser beam having a wavelength, wherein said laser machining system also includes beam optics operable to focus said laser beam to a focal spot;

determining laser parameters for producing said focal spot suitable forming a chamfer within said top surface, wherein said bulk material is substantially transparent to said wavelength of said laser beam and has a fluence ablation threshold, wherein said laser beam has a laser beam fluence that is lower than said fluence ablation threshold of said bulk material except at said focal spot, and wherein said laser parameters cooperate with said beam optics to provide a focused fluence at said focal spot that is greater than said fluence ablation threshold of said bulk material;

generating said laser beam;

directing a laser beam onto said top surface of said workpiece; and moving said laser beam in relation to said workpiece to translate said laser beam across said top surface along a plurality of separate paths, wherein said plurality of separate paths includes first and second paths, wherein along said first path said focal spot is focused at said top surface such that said focal spot provides said focused fluence sufficient to remove bulk material from said top surface to form a kerf in said top surface of said workpiece, and wherein along said second path said focal spot is changed to be more deeply within said bulk material with respect to said top surface such that said focal spot provides said focused fluence sufficient to remove bulk material to extend said kerf more deeply into said bulk material, wherein directing said laser beam comprises directing said laser beam to intersect said workpiece at one or more angles between substantially parallel and substantially perpendicular to said top surface of said workpiece and substantially perpendicular to said paths.

* * * * *